(12) United States Patent
Randle et al.

(10) Patent No.: US 7,874,259 B2
(45) Date of Patent: Jan. 25, 2011

(54) STEERING SYSTEM

(75) Inventors: James Neville Randle, Welford on Avon (GB); Terence James Roycroft, Waiuku (NZ)

(73) Assignee: Gibbs Technologies Limited, Isle of Man (IM)

( * ) Notice: Subject to any disclaimer, the term of this patent is extended or adjusted under 35 U.S.C. 154(b) by 0 days.

(21) Appl. No.: 10/494,474

(22) PCT Filed: Oct. 24, 2002

(86) PCT No.: PCT/GB02/04842

§ 371 (c)(1),
(2), (4) Date: Apr. 28, 2004

(87) PCT Pub. No.: WO03/037663

PCT Pub. Date: May 8, 2003

(65) Prior Publication Data

US 2005/0011426 A1    Jan. 20, 2005

(30) Foreign Application Priority Data

Nov. 1, 2001    (GB) ................................. 0126195.7

(51) Int. Cl.
*B63H 25/42* (2006.01)
*B63H 25/46* (2006.01)
*B60F 3/00* (2006.01)

(52) U.S. Cl. ................... 114/144 R; 114/150; 440/12.5; 440/12.51; 440/12.66

(58) Field of Classification Search ............. 114/144 R, 114/150; 440/12.5, 12.51, 12.53, 12.54, 440/12.56, 12.63, 12.66, 58, 59, 61 R, 61 S, 440/61 C; 180/6.24–6.4, 409–411; 74/484 R
See application file for complete search history.

(56) References Cited

U.S. PATENT DOCUMENTS 2,278,255 A * 3/1942 Grabbe ................... 440/12.58

(Continued)

FOREIGN PATENT DOCUMENTS

FR    2600944 A * 1/1988

(Continued)

OTHER PUBLICATIONS

International Search Report dated Feb. 4, 2003.

(Continued)

*Primary Examiner*—Ajay Vasudeva
(74) *Attorney, Agent, or Firm*—Young & Basile, P.C.

(57) ABSTRACT

Road and marine steering means in an amphibious vehicle are linked so that the ratio between them is variable. In a first embodiment, an arm connects a lever to a steering rack. A cable operates the marine steering means. The lever pivots about a pin, which may be moved along a slot by the motor and gearbox driving screw shaft. At pin position A, full road steering travel x is achieved with minimal marine steering travel. At pin position B, road and marine steering have equal travel x'; and at position C, full marine steering travel z is achieved with minimal road steering travel y. In a further embodiment, a lever arm fixed to steering rack casing has a cam profile constraining pin. Full marine steering travel z of the cable is achieved over rack travel y. The steering wheel controls both road and marine steering.

28 Claims, 8 Drawing Sheets

U.S. PATENT DOCUMENTS

| | | | |
|---|---|---|---|
| 2,420,154 A * | 5/1947 | Stephens, Jr. | 114/144 R |
| 3,213,821 A | 10/1965 | Godwin | |
| 3,395,672 A | 8/1968 | Ruf | |
| 3,755,835 A | 9/1973 | Boersig | 9/1 |
| 3,823,617 A * | 7/1974 | Infanger et al. | 74/498 |
| 4,811,805 A * | 3/1989 | Yoshida et al. | 180/414 |
| 5,590,617 A | 1/1997 | Gere et al. | 114/270 |
| 5,727,494 A | 3/1998 | Caserta et al. | 114/270 |
| 6,796,856 B2 * | 9/2004 | Roycroft et al. | 440/12.51 |

FOREIGN PATENT DOCUMENTS

| | | | |
|---|---|---|---|
| JP | 01018709 A * | 1/1989 | |
| JP | 04208611 A * | 7/1992 | |

OTHER PUBLICATIONS

Search Report of Great Britain, dated Jan. 25, 2002.

* cited by examiner

STEERING SYSTEM

FIELD OF THE INVENTION

This invention relates to a steering system for an amphibious vehicle and to an amphibious vehicle having such a steering system.

BACKGROUND OF THE INVENTION

It is already known to provide amphibious vehicles with steering systems capable of operation on land and water. Most simply, these systems are composed of two independent steering arrangements, for example, a steering wheel which is connected to a conventional rack and pinion arrangement for land operation, and a tiller, which is connected to the head of a rudder for water operation.

In more advanced steering systems, a steering wheel controls both land steering and water steering. For example, in U.S. Pat. No. 5,727,494, an amphibious vehicle is disclosed having a steering wheel connected to a fixed gear box by means of a shaft. The fixed gearbox is telescopically connected to a moving gear box, and steering rods connected to the moving gear box enable turning of the front wheels of the vehicle. The steering shaft is also connected to a mechanical cable steering system which controls turning of a rudder. The land and water steering arrangements are both permanently connected to the steering wheel. It is considered that known cable steering systems are inflexible in their relation of force to distance. Movement of the marine steering system may be undesirable in road mode.

SUMMARY OF THE INVENTION

It is an object of the present invention to provide a steering system for an amphibious vehicle which overcomes the limitations of the prior art systems.

In accordance with a first aspect of the invention, there is provided a steering system for an amphibious vehicle, the system comprising an actuator for steering at least one road wheel of the vehicle, the actuator having steering travel, and a marine steering means, the system further comprising means for converting travel of the road steering actuator into movement of the marine steering means, characterised in that the ratio between the travel of the road steering actuator and the movement of the marine steering means is variable.

In a first preferred arrangement, the ratio between the travel of the road steering actuator and the movement of the marine steering means is selectively variable. This may be achieved by means of a steering system in which the means for converting travel of the road steering actuator into movement of the marine steering means comprises a pivotable lever, the system further comprising means for adjusting the position of the fulcrum of the lever so as to vary the ratio between the travel of the road steering actuator and the movement of the marine steering means.

Preferably, a first end of the lever is operatively connected for movement with the road steering actuator and a second end of the lever is operatively connected for movement with the marine steering means, the lever pivoting about a fulcrum arranged between the first and second ends, the system having means for adjusting the position of the fulcrum relative to the ends of the lever so as to vary the ratio between the travel of the road steering actuator and the movement of the marine steering means.

In a particularly preferred arrangement, the means for adjusting the position of the fulcrum comprises an actuator which may be in the form of a motor. The fulcrum may be mounted to an adjusting nut having a threaded bore and the motor may be adapted to rotate a screw shaft which is in engagement with the threaded bore, to move the fulcrum.

In as second preferred arrangement, the ratio between the travel of the road steering actuator and the movement of the marine steering means varies in dependence on the movement or travel of the road steering actuator from a straight ahead position. This may be achieved by means of a steering system in which the means for converting travel of the road steering actuator into movement of the marine steering means is adapted to provide a first ratio between the travel of the road steering actuator and the movement of the marine steering means over a first range of movement or travel of the road steering means from the straight ahead position and is adapted to provide a second, different ratio between the travel of the road steering actuator and the movement of the marine steering means during movement or travel of the road steering means beyond the first range.

Preferably, the means for converting travel of the road steering actuator into movement of the marine steering means is adapted to provide substantially no movement of the marine steering means during movement or travel of the road steering actuator beyond the first range.

Preferably, the converter means includes cam means adapted to move the marine steering means through its full range of steering movement in response to a partial movement or travel of the road steering actuator.

Advantageously, the cam means includes a cam plate pivotable about a first point fixed relative to the road steering actuator and having a cam surface, a cam follower adapted for movement with the road steering actuator and which cooperates with the cam surface to pivot the cam plate about the fast point in response to travel of the road steering actuator, the system further comprising means to transmit movement of the cam plate to the marine steering means.

In accordance with a second aspect of the invention, there is provided a steering system for an amphibious vehicle, the system comprising an actuator for steering at least one road wheel of the vehicle, the actuator having predetermined maximum road steering travel, and a marine steering means, the system further comprising converter means for converting travel of the road steering actuator into movement of the marine steering means, characterised in that the converter means is adapted such that the marine steering means can be moved through its full range of steering movement in response to a partial movement or travel of the road steering actuator, which is less than the predetermined maximum road steering travel.

In accordance with a third aspect of the invention, there is provided an amphibious vehicle having a steering system in accordance with the first aspect of the invention or the second aspect of the invention.

BRIEF DESCRIPTION OF THE DRAWINGS

Several embodiments of the invention will now be described, by way of example only, with reference to the accompanying drawings in which.

DETAILED DESCRIPTION OF THE PREFERRED EMBODIMENT

Figure 1:
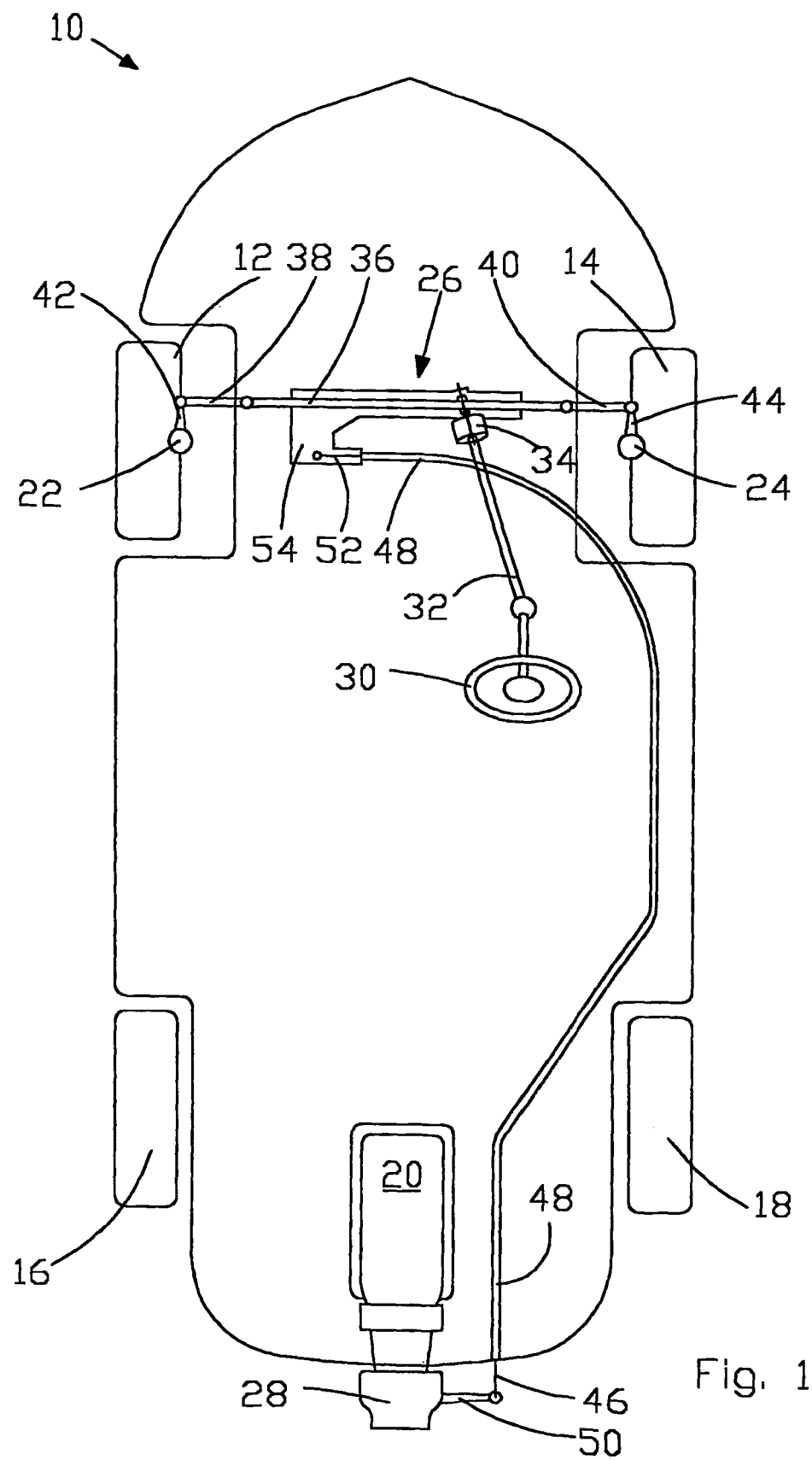
FIG. 1 is a schematic plan view of an amphibious vehicle having a first embodiment of a steering system in accordance with the invention.

With reference firstly to FIG. 1, an amphibious vehicle capable of powered travel in land and marine modes is indicated generally at 10. The vehicle 10 includes a pair of steerable front wheels 12, 14, a pair of rear wheels 16, 18 and a waterjet unit 20. The front wheels 12,14 are supported in conventional manner by suspension members (not shown) mounted on wheel support uprights 22, 24.

The vehicle has a steering system which includes a rack and pinion assembly 26 for steering the vehicle on land, and a moveable nozzle 28 on the waterjet 20, for steering the vehicle on water.

Steering of the vehicle both on land and on water is controlled by means of a common steering wheel 30 mounted to one end of a steering column 32. The other end of the column is attached to a pinion 34 of the rack and pinion assembly such that rotary motion of the steering wheel is converted into linear travel of a steering rack 36 in a known manner. The ends 38, 40 of the rack are attached to steering arms 42, 44 which project from the wheel support uprights of respective front wheels 12, 14. The steering rack 36 can be considered as an actuator for steering the front wheels of the vehicle.

One end 46 of a push-pull cable 48 is attached to a steering arm 50 of the nozzle 28. The other end 52 of the cable 48 is attached to a mechanism (indicated generally at 54 in FIG. 1) which converts travel of the steering rack 36 into movement of the cable 48 and hence into movement of the nozzle 28. The mechanism 54 can be seen in detail in FIG. 2.

The mechanism 54 comprises a lever 56 having an elongate slot 58 for receiving a fulcrum pin 60 about which the lever 56 pivots. A first end 62 of the lever 56 is pivotably connected to one end of a link 64, while the other end of the link is pivotably connected to the steering rack 36 by means of a pivot 66. The arrangement is such that linear movement of the rack 36 is transmitted to the first end 62 of the lever 56 via the link 64, to pivot the lever about the fulcrum pin 60. A second end 68 of the lever is pivotably connected to the end 52 of the cable 48 by means of a clevis pin 65 or by any other suitable arrangement. Numeral 49 denotes a fixed outer cable sheath.

The elongate slot 58 is aligned with a central longitudinal axis of the lever and extends over the major portion of the length of the lever. The position of the fulcrum pin 60 within the slot is adjustable so as to vary the ratio of movement between the first 62 and second 68 ends of the lever 56 about the fulcrum pin 60. In the present embodiment, the means for adjusting the position of the fulcrum pin comprises an electric motor 70 and gearbox 72, which drive a screw shaft 74. The screw shaft 74 is received in a threaded bore of an adjuster nut (76, FIG. 4) to which the fulcrum pin 60 is mounted. The arrangement is such that rotational movement of the screw shaft 74 results in the fulcrum pin 60 moving linearly to vary its position within the slot 58. Movement of the fulcrum pin 60 is guided by a pair of trackways (98, 102, FIG. 4) formed in a housing 77 of the mechanism 54.

It will be understood by those skilled in the art that many other mechanisms could be employed to adjust the position of the fulcrum pin. For example, the fulcrum pin 60 could be mounted to a slider mechanism and moved by means of a hydraulic or pneumatic actuator.

Figure 2:
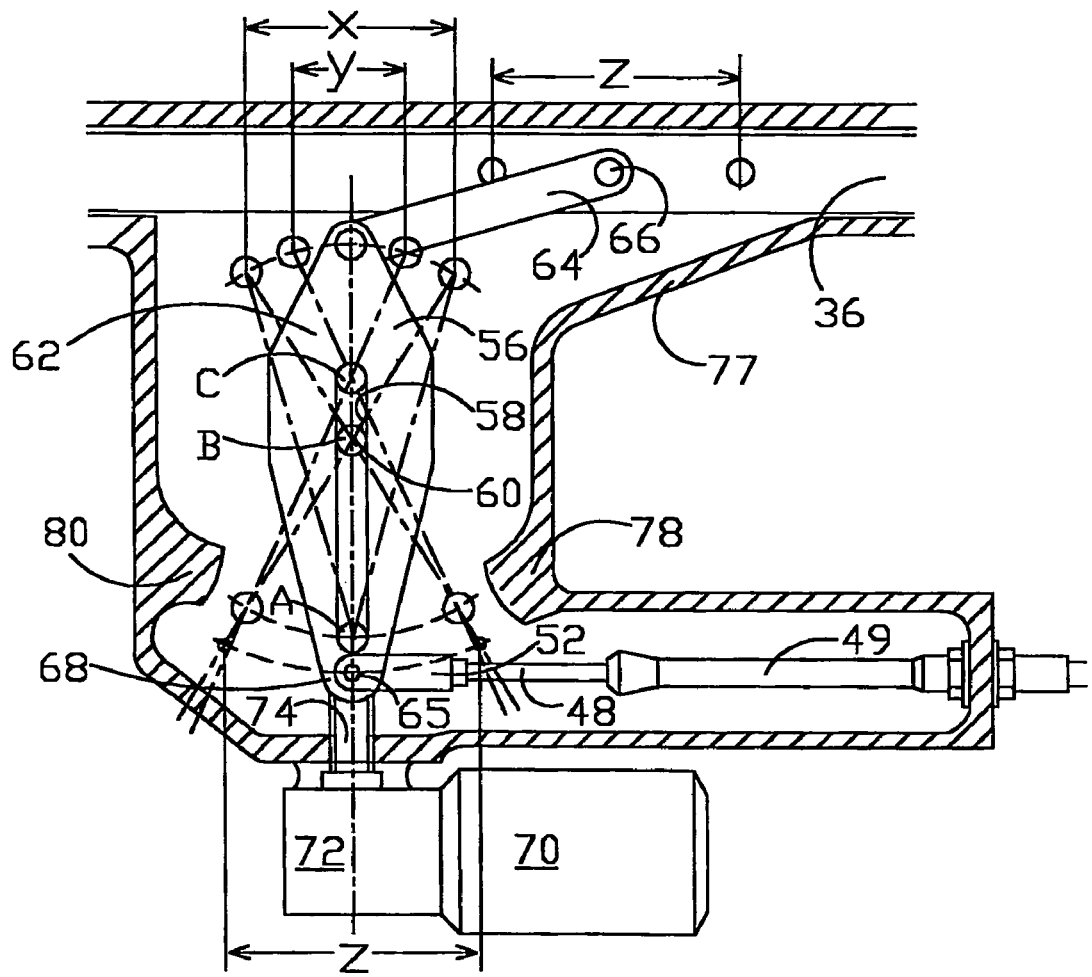
FIG. 2 is an enlarged plan view, partly in cross section, of part of the steering system of FIG. 1.

While the fulcrum pin 60 can be adjusted to any desired position along the length of the slot, operation of the steering system will be described with reference to three principal positions indicated as A, B & C in FIG. 2.

When an operator of the vehicle wishes to steer the vehicle, the operator uses the steering wheel 30 in a conventional manner. As has already been described above, rotation of the steering wheel 30 results in linear travel of the steering rack The full linear travel of the steering rack is limited, in a known manner, by road steering stops (not shown) to a distance indicated at x in FIG. 2. Typically, the road steering ratio is such that the steering wheel is rotated by two to three turns in order to move the steering rack though the full travel x from lock to lock.

Linear movement of the steering rack 36 is transmitted through the link 64 to the first end 62 of the lever, causing the first end 62 to pivot about the fulcrum pin 60. As shown in FIG. 2, full travel x of the steering rack results in a pivotal movement x' of the first end 62 of the lever about the fulcrum pin. In contrast, partial movement of the steering rack will result in the first end 62 of the lever pivoting by a reduced amount y.

When the fulcrum pin 60 is in position A, full travel x of the steering rack results in negligible movement of the second end of the lever about the fulcrum pin 60 such that the cable 48 and the nozzle 28 are not moved. Thus with the fulcrum pin in position A, the marine steering system is effectively de-activated so that movement of the steering wheel, and hence the steering rack 36, does not result in movement of the nozzle 28.

With the fulcrum pin 60 in position B, the lever has a ratio of 1:1 which means that pivotal movement of the first end 62 of the lever about the fulcrum pin 60 produces an equal movement of the second end 68 of the lever. As depicted in FIG. 2, full travel x of the steering rack 36 results in a corresponding full movement z of the second end 68 of the lever. The system is arranged such that full movement z of the second end 68 of the lever moves the cable 48 through an amount which is sufficient to move the nozzle 28 through its full range of steering movement.

Moving the fulcrum pin 60 to position C increases the lever ratio further such that a partial movement y of the first end 62 of the lever, as a result of a partial movement of the steering rack 36, results in a full movement z of the second end 68 of the lever. The movement z of the second end 68 of the lever is limited by marine steering stops 78, 80 provided on the housing 77. With the fulcrum pin in this position, the overall steering ratio for the marine steering means is increased so that the nozzle 28 can be moved through its full steering movement by, say, one turn of the steering wheel. Typically, the lever has a ratio in the region of 1:2 when the fulcrum pin is in position C but any suitable ratio maybe selected.

The arrangement described above provides a reliable and flexible steering system for the vehicle in both land and marine modes. With the fulcrum pin in position A, the amphibian can be steered on land using a normal automotive steering ratio of say 2 to 3 turns lock to lock of the steering wheel, while the marine steering nozzle 28 (or other marine steering means such as a rudder) is held at the neutral centre. When the vehicle enters or leaves the water in a transitional mode, the fulcrum pin 60 is moved to position B wherein the automotive steering ratio is applied to both the wheels and the marine steering system. When the amphibian is in full marine mode, the fulcrum is moved to position C wherein a higher steering ratio is applied to the marine steering system, e.g., 1 turn lock to lock, while the road wheels are restricted to partial steering motion limited by the marine steering stops.

Adjustment of the position of the fulcrum pin 60 as the vehicle changes between road and marine modes is preferably controlled automatically by a suitable control system (not shown). The control system may comprise sensors for detecting when the vehicle is entering or leaving a body of water to determine when a change of steering mode is required or the control system may operate in response, to input commands from an operator of the vehicle that a change in the steering mode is required. Alternatively, adjustment of the fulcrum position can be effected manually by the operator of the vehicle.

Figure 3:
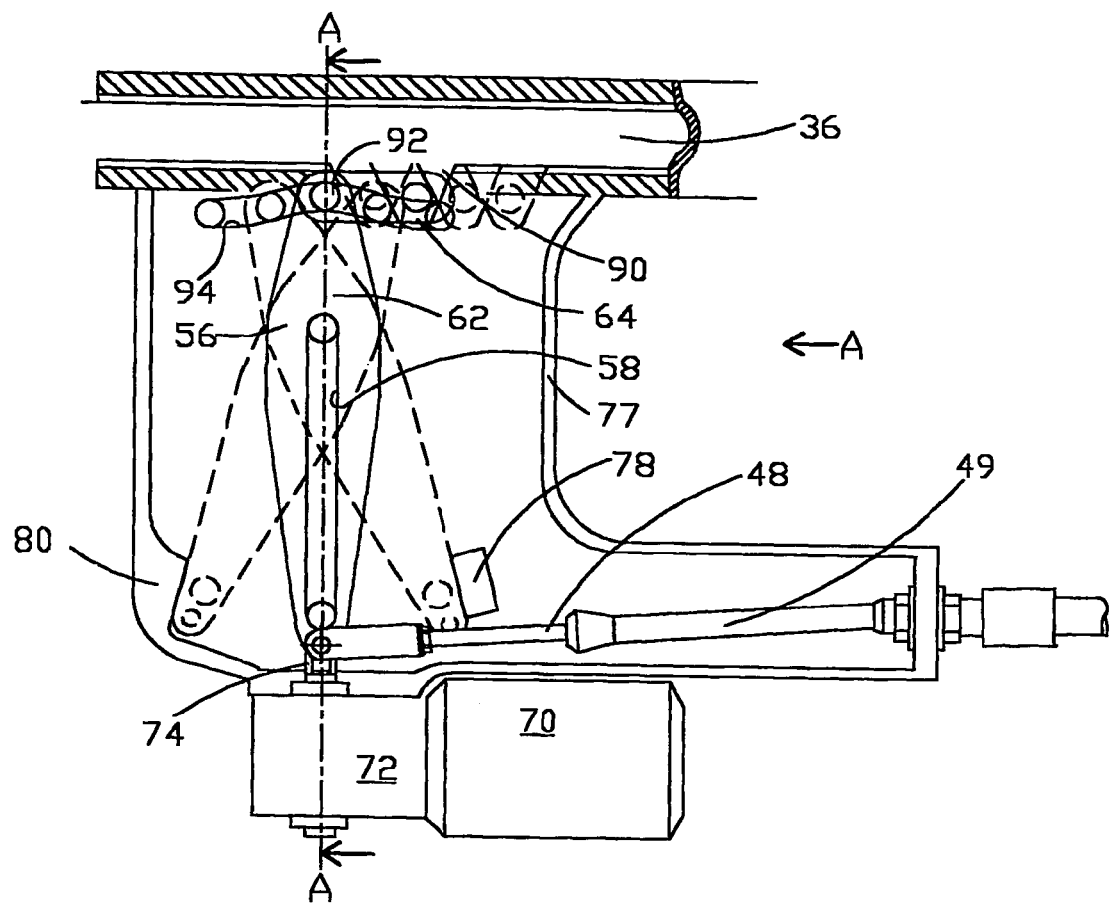
FIG. 3 is a view similar to that of FIG. 2 but showing a second embodiment of a steering system in accordance with the invention.
Figure 4:
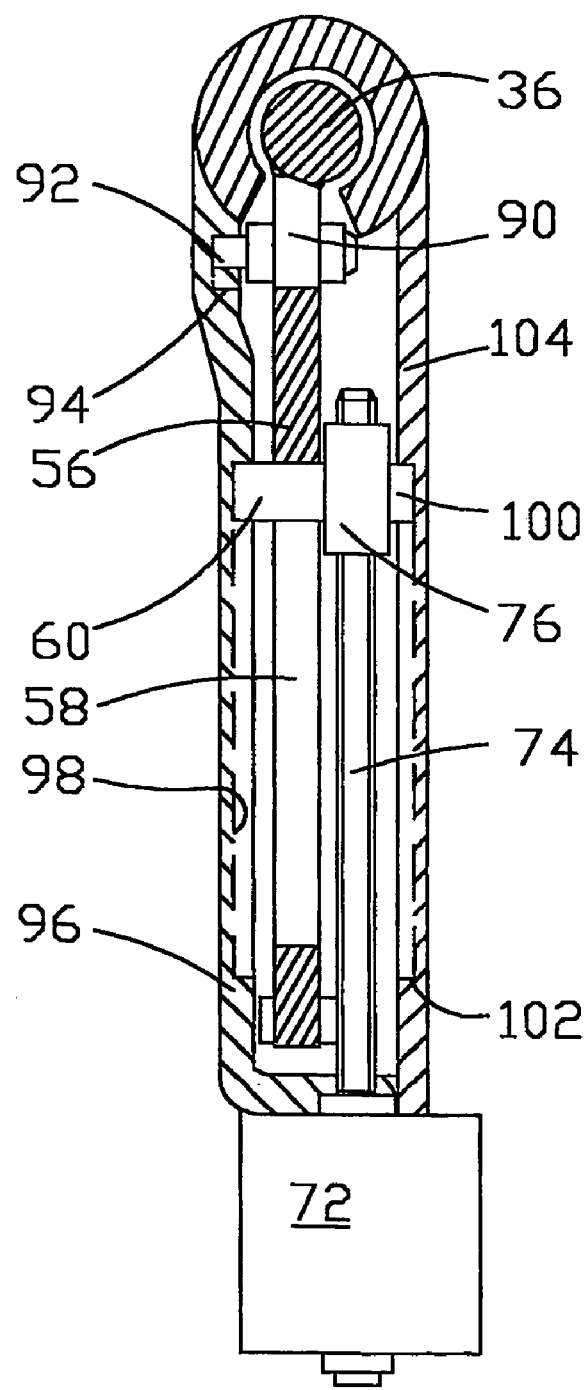
FIG. 4 is sectional view taken along line A-A in FIG. 3.

FIGS. 3 and 4 show a second embodiment of a steering system in accordance with the invention. The steering system of FIGS. 3 and 4 is very similar to that of FIGS. 1 and 2 and operates in the same way, the only differences being that:

the link 64 is attached to a drive lug 90 projecting from the steering rack 36; and movement of the first end 62 of the lever 56 is guided by engagement of a pivot pin 92, which connects the link 64 to the first end 62 of the lever, with a guide track 94 formed in the housing 77 of mechanism 54.

The guide track 94 is formed in an upper portion 96 of the housing 77 and receives an end of the pivot pin 92. The guide track 94 is shaped to conform with the locus of the pivot pin 92 as the first end 62 of the lever pivots about the fulcrum pin 60, as can best be seen in FIG. 3. This arrangement helps to ensure proper movement of the lever 56 and improves the overall stability of the mechanism.

FIG. 4 also shows the adjust mechanism for the fulcrum pin 60 in more detail as a section through line A-A in FIG. 3. The adjusting nut 76 is mounted via a threaded bore on the screw shaft 74. The fulcrum pin 60 extends upwardly from the adjusting nut through the slot 58 in the lever 56 and engages in a slide trackway 98 provided in the upper portion of the housing 77. A lower pin portion 100 extends downwardly from the adjusting nut and is received in a further slide trackway 102 formed in a lower portion 104 of the housing 77.

Figure 5:
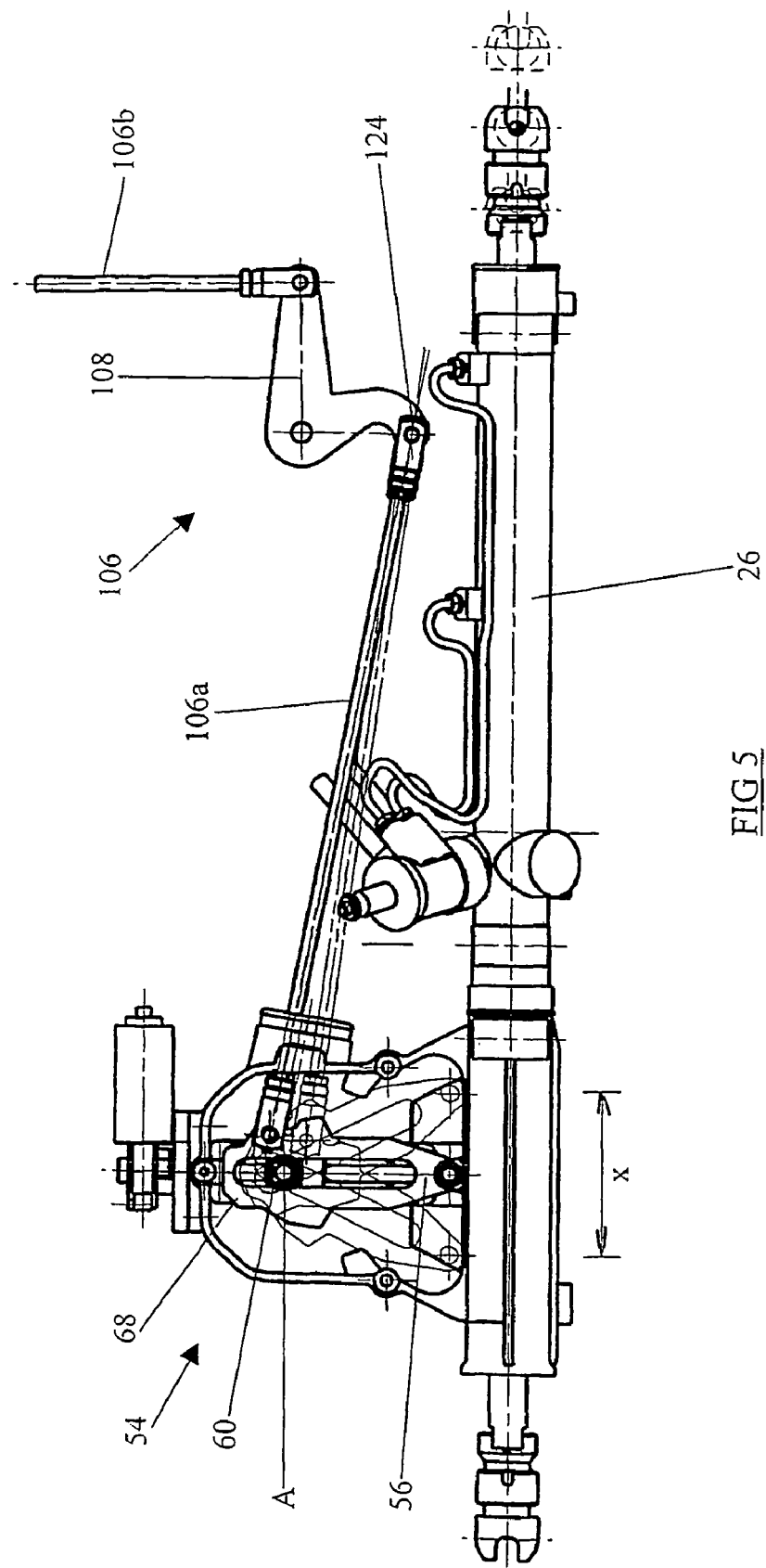
FIG. 5 is a plan view, partly in section, of a third embodiment of a steering system in accordance with the invention, showing the system in a road use mode.
Figure 6:
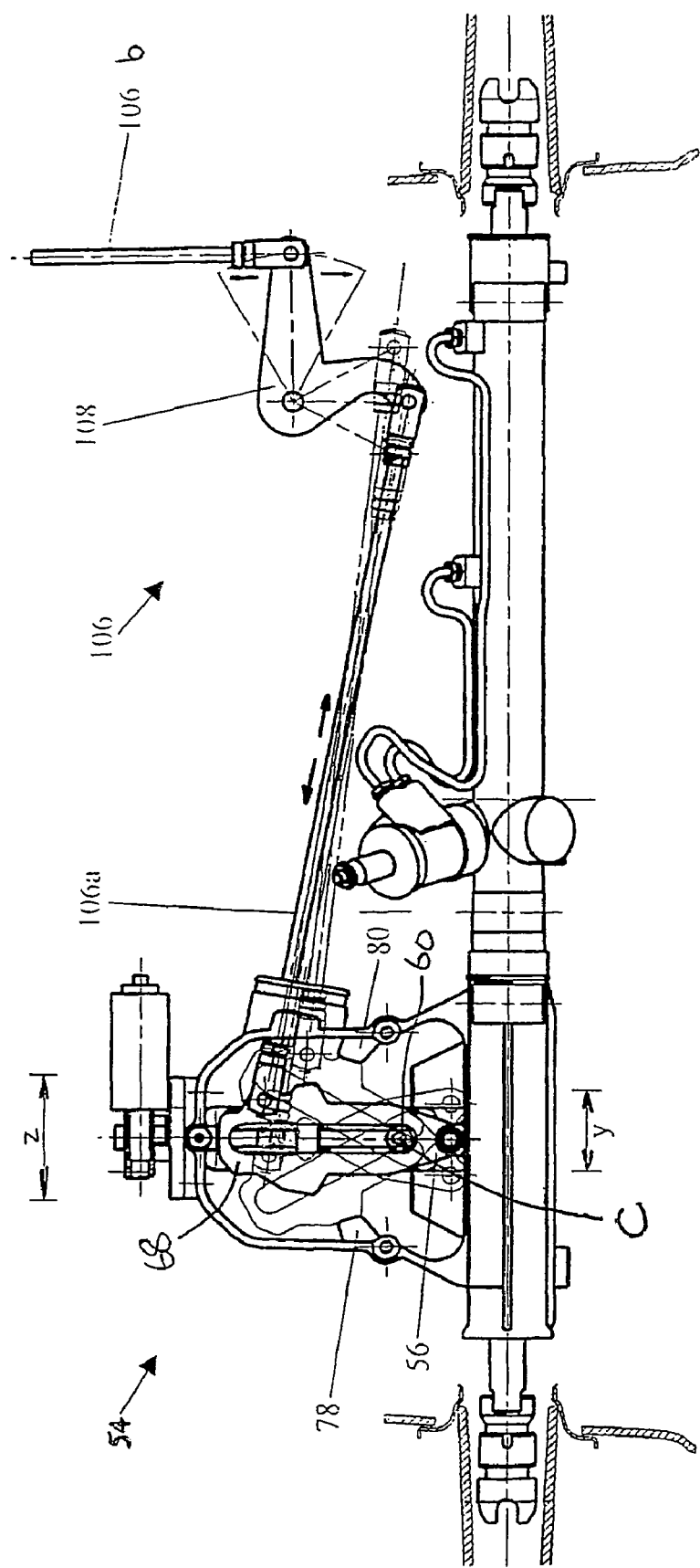
FIG. 6 is a view similar to that of FIG. 5 but showing the system in a marine use mode.
Figure 7:
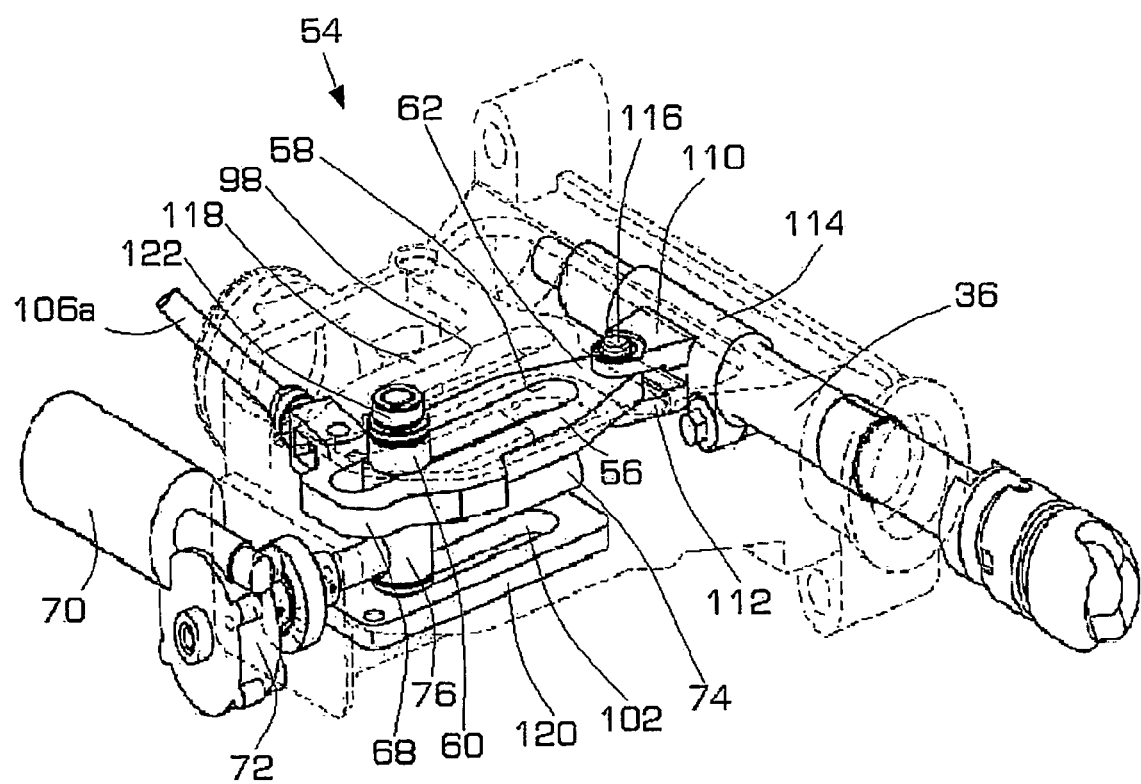
FIG. 7 is an enlarged, perspective, ghosted view showing details of part of the steering system of FIGS. 5 and 6.

A third embodiment of the invention is shown in FIGS. 5 to 7. In this embodiment, the steering rack assembly 26 is power assisted and movement of the pivotable lever 56 is transmitted to the jet nozzle by means of a system of rods, indicated generally at 106 and which includes one or more pivotable links 108 as required.

The mechanism 54 which converts travel of the steering rack 36 into movement of the rods, and thus the nozzle, can be seen best in FIG. 7. In this embodiment, the pivotable lever 56 is attached directly to steering rack 36 rather than through a pivotable link as in the first embodiment. For this purpose, a pair of lugs 110, 112 project from a clamp member 114 which can be clamped firmly to the steering rack 36 so as to be constrained to move with the rack. The first end 62 of the lever is received between the two lugs, and a pivot pin 116 passes through corresponding holes in the lever and the lugs and is held in position by means of one or more circlips or by any other suitable means. An end of a first rod member 106a is pivotably attached to the second end 68 of the lever 56 by means of a clevis pin, or by any other suitable arrangement.

As with the previous embodiments, the lever 56 has an elongate slot 58 which receives an adjustable fulcrum pin 60, about which the lever 56 pivots. The fulcrum pin 60 projects from an adjuster nut 76 which is mounted by means of a threaded bore on a screw shaft 74. The shaft 74 is rotated by means of an electric motor 70 and a gearbox 72. Movement of the fulcrum pin is guided by means of slide trackways 98, 102 which are formed in upper and lower guide members 118, 120 respectively and which receive upper 122 and lower (not shown) projections of the fulcrum pin 60 and/or adjuster nut 76.

As with the previous embodiments, the mechanism 54 converts lateral travel of the steering rack 36 into pivotal movement of the lever 56 about the fulcrum pin 60. Movement of the second end 68 of the lever results in a corresponding movement of the rod system 106 which in turn moves a water jet nozzle or some other marine steering means such as a rudder.

FIGS. 5 and 6, show the system in road mode and marine mode respectively. The upper guide member 118 has been omitted from these Figures for clarity.

FIG. 5 shows the system with the fulcrum pin 60 in position A. With the fulcrum in this position, full lateral travel x of the steering rack results in minimal movement of the second end 68 of the lever. As shown in FIG. 5, the first rod 106a in the rod system is subjected only to a small pivotal movement about its connection 124 with pivotable link 108, such that no movement is transferred to a second rod 106b in the rod system, or to the nozzle.

In FIG. 6, the fulcrum pin 60 has been moved to position C. In this position a partial movement y of the steering rack results in a full movement z of the second end 68 of the lever 56 about the fulcrum pin 60. As a result the first rod 106a is subjected to longitudinal movement, as indicated by the arrows, which is transferred via pivotal link 108 to the second link member 106b and hence to the nozzle. Movement z of the lever is limited by marine steering stops 78, 80 and the system is arranged such that this amount of movement of the second end 68 of the lever is sufficient to turn the nozzle through its full steering movement.

The fulcrum pin 60 in the third embodiment can be positioned at any point between the positions A and C shown in FIGS. 5 and 6, and in particular can be positioned at a point where the ratio of movement between the first and second ends of the lever 56 is 1:1. The third embodiment can be operated in the same manner as the first embodiment as the vehicle changes between marine and road modes of use.

Figure 8:
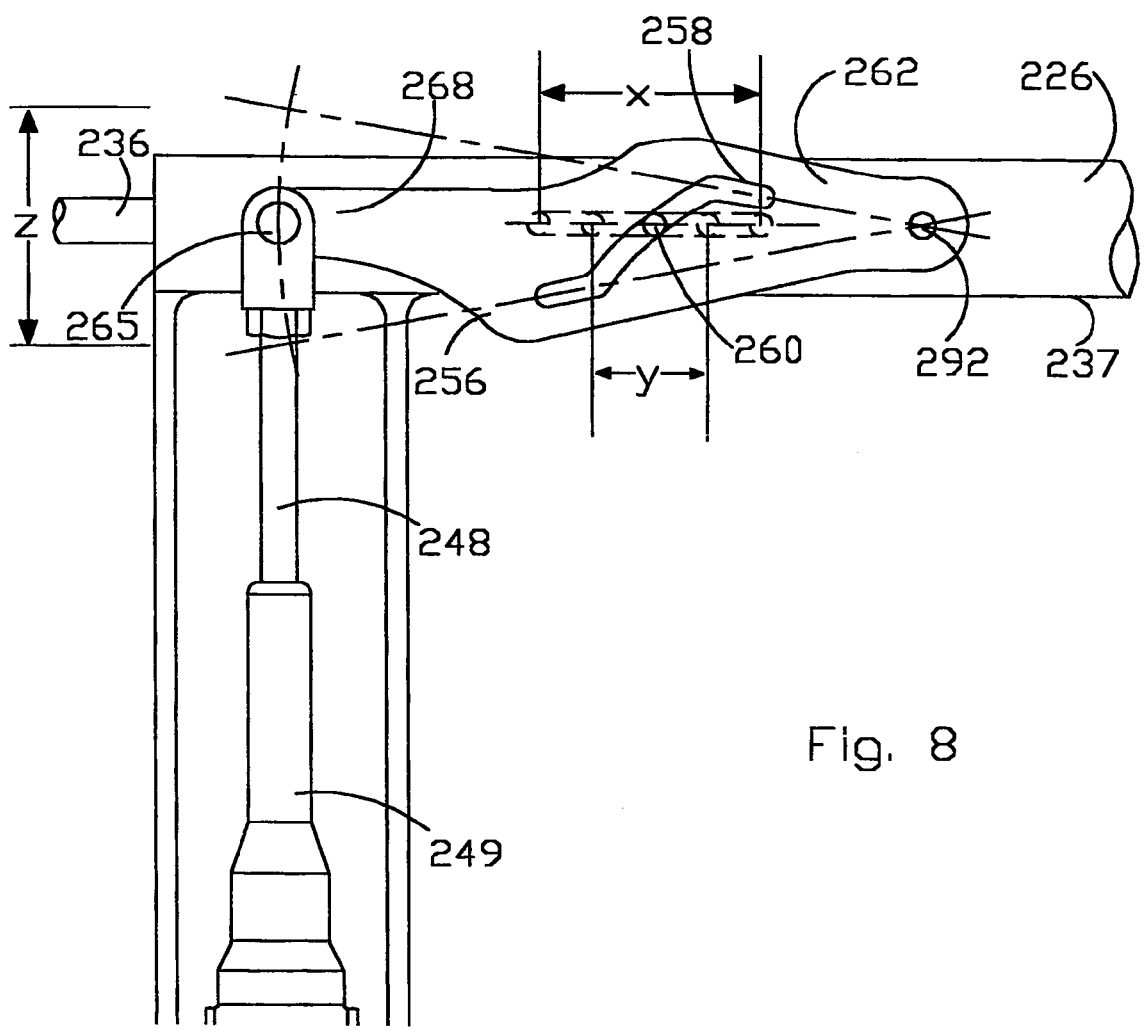
FIG. 8 is a plan view, partly in section, showing part of a further embodiment of a steering system in accordance with the invention.

FIG. 8 shows a further embodiment of a steering system for an amphibious vehicle, in accordance with the invention. The further embodiment includes a steering rack and pinion assembly 226 for steering the front road wheels of the vehicle in a conventional manner and a marine steering means (not shown), such as a movable nozzle of a waterjet or a rudder. Movement of the marine steering means is controlled by a cable 248 in response to travel of a steering rack 236 of the rack and pinion assembly 226, as described below.

A first end 262 of a lever arm or cam plate 256 is pivotally connected to a casing or body 237 of the steering rack assembly 226 by means of a pivot 292. The other end 268 of the cam plate is attached to an end of the cable 248 by means of a clevis pin 265. The cam plate has a generally "S" shaped slot 258 which receives a cam follower 260 in the form of a pin or peg which is fixed for movement with the steering rack 236. The edges of the slot 236 form a cam surface which cooperates with the cam follower such that lateral movement of the steering rack 236 causes the cam plate to rotate about the pivot 292. The rotary movement of the cam plate 256 about the pivot 292 moves the cable 248 which is attached to a steering arm (not shown) of the marine steering means.

The steering rack 236 has a predetermined maximum steering travel which is indicated at x on FIG. 8, this travel being limited by road steering stops as is known in the art. The road steering system has a typical automotive steering ratio such that the steering rack is moved through its maximum steering travel in response to 2 to 3 turns of a steering wheel, lock to lock. However, for marine use this steering ratio is not appropriate and the system is designed such that the marine steering means is moved through its full steering movement in response to less movement of the steering wheel, for example 1 turn lock to lock. This is achieved by shaping the slot 258 such that the cam plate 256 is rotated about the pivot 292 only over a partial movement of the steering rack 236 as indicated at y in FIG. 8. The movement of the second end 268 of the cam plate generated over the partial movement y is indicated in FIG. 8 at Z, and the system is arranged such that movement of the second end 268 of the cam plate by an amount Z moves the cable 248 by an amount which is sufficient to move the marine steering means through its full range of steering movement.

In FIG. 8, the position of the cam follower 260 when the steering rack 236 is in the straight ahead position is shown in solid lines. It can be seen that the slot 258 is shaped so that over a first range of movement y of the steering rack 236 from the straight ahead position, a first ratio of movement of the steering rack to the movement of the marine steering means is provided. In this embodiment that ratio is in the region of 2:1 to 3:1. However during movement of the steering rack beyond the first range movement a different ratio is applied, which in this case results in substantially no movement of the marine steering means taking place.

The embodiment shown in FIG. 8, differs from the previous embodiments in that the marine steering means is operative at all times, even when the vehicle is used on land. However, the arrangement is simple and reliable and does not require a control system to effect changes in the marine steering ratio.

Whereas the invention has been described in relation to what are presently considered to be the most practical and preferred embodiments, it is to be understood that the invention is not limited to the disclosed arrangements but rather is intended to cover various modifications and equivalent constructions included within the spirit and scope of the invention. For example, the marine steering means need not be a water jet nozzle but could be any suitable means such as a rudder. Furthermore, the invention is not limited to application to vehicles having a steering rack to steer the road wheels. The invention could, for example, be applied to a vehicle, having any other road steering means such as a steering box. In this case, the mechanism for converting travel of the road steering actuator into movement of the marine steering means can be connected with any part of the road steering means which has a suitable travel. It should also be understood that any suitable means, including hydraulic or electric telemotor, pneumatic, mechanical, electrical or electronic—for example "steer by wire"—may be used to transmit movement of the second end of the lever or the cam plate to the marine steering means. Each of the above means offers ways to vary the ratio between road and marine steering; for example by variable hydraulic valves, or by electronics with variable mapping.

What is claimed is:

1. A steering system for an amphibious vehicle, the system comprising:
    a road steering actuator for steering at least one road wheel of the vehicle in response to travel of the road steering actuator,
    a marine steering means,
    means for converting travel of the road steering actuator into movement of the marine steering means, and
    means for varying the ratio of the travel of the road steering actuator and the movement of the marine steering means is variable between first and second finite ratios,
    wherein said means for converting travel and said means for varying the ratio of the travel are controllable independently of one another.

2. A steering system as claimed in claim 1, in which the ratio between the travel of the road steering actuator and the movement of the marine steering means is selectively variable.

3. A steering system as claimed in claim 1 in which the means for converting travel of the road steering actuator into movement of the marine steering means comprises a pivotable lever, the system further comprising means for adjusting the position of the fulcrum of the lever so as to vary the ratio between the travel of the road steering actuator and the movement of the marine steering means.

4. A steering system as claimed in claim 3, in which a first end of the lever is operatively connected for movement with the road steering actuator and a second end of the lever is operatively connected for movement with the marine steering means, the lever pivoting about a fulcrum arranged between the first and second ends, the system having a mechanism configured for adjusting the position of the fulcrum relative to the ends of the lever so as to vary the ratio between the travel of the road steering actuator and the movement of the marine steering means.

5. A steering system as claimed in claim 4, in which the means for adjusting the position of the fulcrum comprises an actuator.

6. A steering system as claimed in claim 5, in which the actuator comprises a motor.

7. A steering system as claimed in claim 6, in which the fulcrum is mounted to an adjusting nut having a threaded bore and the motor is adapted to rotate a screw shaft which is in engagement with the threaded bore, to move the fulcrum.

8. A steering system as claimed in claim 1, in which the ratio between the travel of the road steering actuator and the movement of the marine steering means varies in dependence on the movement or travel of the road steering actuator from a straight ahead position.

9. An amphibious vehicle in which the vehicle comprises a steering system in accordance with claim 1.

10. A steering system as claimed in claim 1, in which the at least one road wheel is always connected to said road steering actuator.

11. A steering system for an amphibious vehicle, the system comprising:
    road steering means for steering at least one road wheel of the vehicle in response to travel of the road steering means;
    marine steering means, wherein said road steering means and said marine steering means are permanently connected to one another;
    converting means for converting travel of the road steering actuator into movement of the marine steering means; and
    means for varying the ratio of the travel of the road steering actuator and the movement of the marine steering means;
    wherein said marine steering means is coupled to said converting means during movement of said marine steering means; and
    wherein said converting means is operable to move the marine steering means through its full range of steering movement in response to a partial travel of the road steering actuator, the converting means including cam means adapted to move the marine steering means through its full range of steering movement in response to a partial movement or travel of the road steering actuator.

12. A steering system as claimed in claim 11, in which the cam means includes a cam plate pivotable about a first point fixed relative to the road steering actuator and having a cam surface, a cam follower adapted for movement with the road steering actuator and which cooperates with the cam surface to pivot the cam plate about the first point in response to travel of the road steering actuator, the system further comprising means to transmit movement of the cam plate to the marine steering means.

13. A steering system for an amphibious vehicle, the system comprising:
a road steering means for steering at least one road wheel of the vehicle in response to travel of the road steering actuator;
a marine steering means;
means for converting travel of the road steering actuator into movement of the marine steering means; and
means for continuously varying the ratio of the travel of the road steering actuator and the movement of the marine steering means;
wherein said means for converting travel and said means for varying the ratio of the travel are controllable independently of one another.

14. A steering system as claimed in claim 13 in which the means for converting travel of the road steering actuator into movement of the marine steering means comprises a pivotable lever, the system further comprising an adjustment mechanism configured to act upon the fulcrum of the lever so as to vary the ratio between the travel of the road steering actuator and the movement of the marine steering means.

15. A steering system as claimed in claim 14, in which a first end of the lever is operatively connected for movement with the road steering actuator and a second end of the lever is operatively connected for movement with the marine steering means, the lever pivoting about a fulcrum arranged between the first and second ends, the system having an adjustment mechanism configured for adjusting the position of the fulcrum relative to the ends of the lever so as to vary the ratio between the travel of the road steering actuator and the movement of the marine steering means.

16. A steering system as claimed in claim 15, in which the means for adjusting the position of the fulcrum comprises an actuator.

17. A steering system as claimed in claim 16, in which the actuator comprises a motor.

18. A steering system as claimed in claim 16, in which the fulcrum is mounted to an adjusting nut having a threaded bore and the motor is adapted to rotate a screw shaft which is in engagement with the threaded bore, to move the fulcrum.

19. A steering system as claimed in claim 13, in which the ratio between the travel of the road steering actuator and the movement of the marine steering means varies in dependence on the movement or travel of the road steering actuator from a straight ahead position.

20. An amphibious vehicle, in which the vehicle comprises a steering system in accordance with claim 13.

21. A steering system as claimed in claim 13, in which the at least one road wheel is always connected to said road steering actuator.

22. A steering system for an amphibious vehicle, the system comprising:
a road steering means configured for steering at least one wheel of the vehicle in response to travel of a road steering actuator;
marine steering means;
converting means for converting travel of the road steering actuator into movement of the marine steering means; and
means for continuously varying the ratio of the travel of the road steering actuator and the movement of the marine steering means;
wherein said marine steering means is coupled to said converting means during movement of said marine steering means; and
wherein said converting means is operable to move the marine steering means through its full range of steering movement in response to a partial travel of the road steering actuator,
wherein the road steering actuator has a predetermined maximum road steering travel, and the converting means is adapted such that the marine steering means can be moved through its full range of steering movement in response to a partial movement or travel of the road steering actuator, which is less than the predetermined maximum road steering travel; and
wherein the converting means includes cam means adapted to move the marine steering means through its full range of steering movement in response to a partial movement or travel of the road steering actuator.

23. A steering system as claimed in claim 22, in which the cam means includes a cam plate pivotable about a first point fixed relative to the road steering actuator and having a cam surface, a cam follower adapted for movement with the road steering actuator and which cooperates with the cam surface to pivot the cam plate about the first point in response to travel of the road steering actuator, the system further comprising means to transmit movement of the cam plate to the marine steering means.

24. A steering system for an amphibious vehicle, the system comprising:
road steering means configured for steering at least one road wheel of the vehicle in response to travel of the road steering actuator;
a marine steering means; and
means for converting travel of the road steering actuator into movement of the marine steering means;
wherein the ratio of the travel of the road steering actuator and the movement of the marine steering means is variable;
wherein said road steering means and said marine steering means are permanently connected to one another;
wherein the means for converting travel of the road steering actuator into movement of the marine steering means comprises a pivotable lever, the system further comprising an adjustment mechanism configured to act upon the fulcrum of the lever so as to vary the ratio between the travel of the road steering actuator and the movement of the marine steering means; and
wherein a first end of the lever is operatively connected for movement with the road steering actuator and a second end of the lever is operatively connected for movement with the marine steering means, the lever pivoting about a fulcrum arranged between the first and second ends, the system having means for adjusting the position of the fulcrum relative to the ends of the lever so as to vary the ratio between the travel of the road steering actuator and the movement of the marine steering means, wherein the means for adjusting the position of the fulcrum comprises an actuator.

25. A steering system as claimed in claim 24, in which the actuator comprises a motor.

26. A steering system as claimed in claim 25, in which the fulcrum is mounted to an adjusting nut having a threaded bore and the motor is adapted to rotate a screw shaft which is in engagement with the threaded bore, to move the fulcrum.

27. A steering system for an amphibious vehicle, the system comprising:
- a road steering means for steering at least one road wheel of the vehicle in response to travel of the road steering actuator;
- a marine steering means; and
- means for converting travel of the road steering actuator into movement of the marine steering means;
- wherein the ratio of the travel of the road steering actuator and the movement of the marine steering means is variable;
- wherein said road steering means and said marine steering means are permanently connected to one another;
- wherein the ratio between the travel of the road steering actuator and the movement of the marine steering means varies in dependence on the movement or travel of the road steering actuator from a straight ahead position, and
- wherein the means for converting includes cam means adapted to move the marine steering means through its full range of steering movement in response to a partial movement or travel of the road steering actuator.

28. A steering system as claimed in claim 27, in which the cam means includes a cam plate pivotable about a first point fixed relative to the road steering actuator and having a cam surface, a cam follower adapted for movement with the road steering actuator and which cooperates with the cam surface to pivot the cam plate about the first point in response to travel of the road steering actuator, the system further comprising means to transmit movement of the cam plate to the marine steering means.

* * * * *